UNITED STATES PATENT OFFICE.

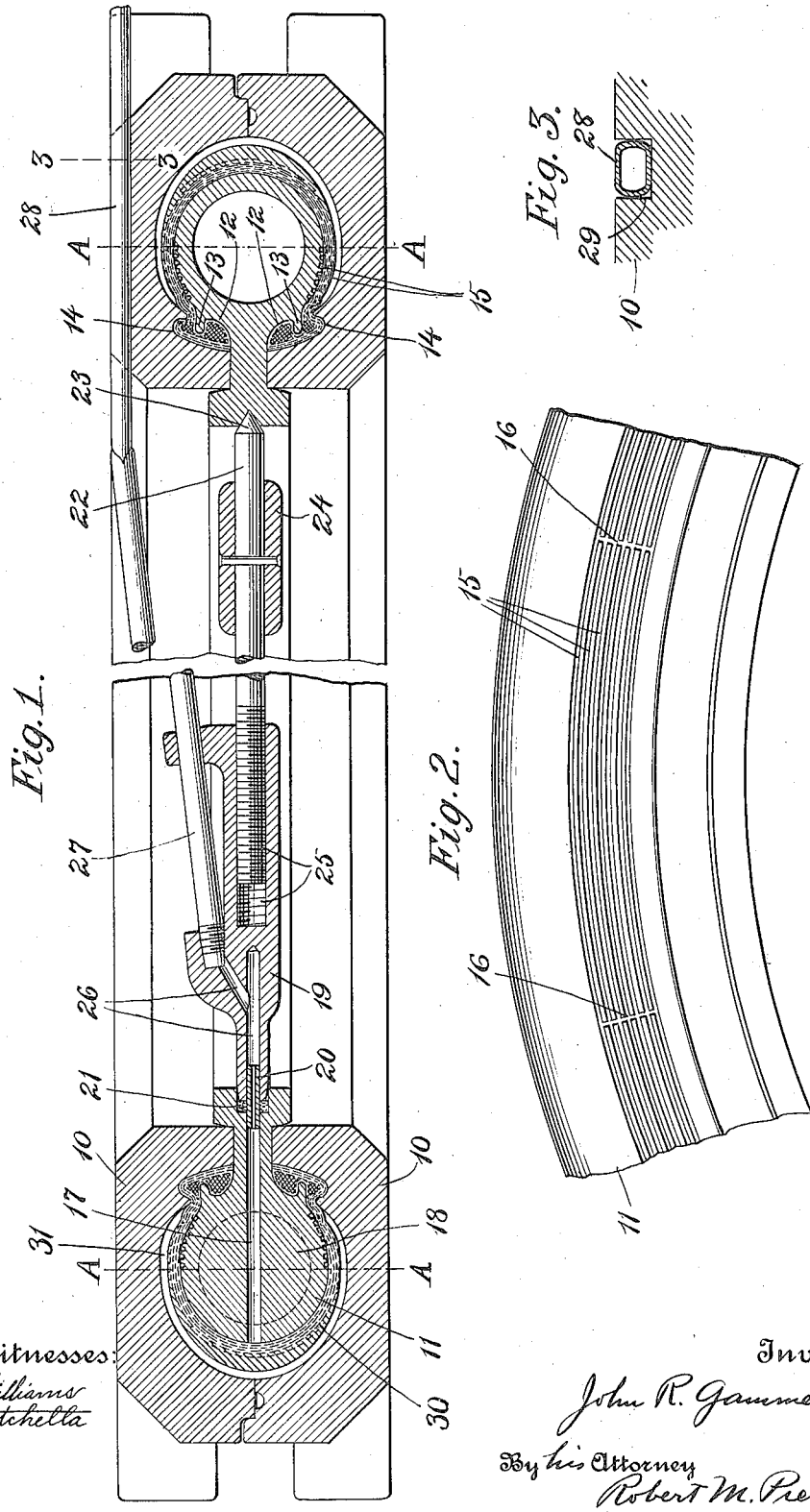

JOHN R. GAMMETER, OF AKRON, OHIO, ASSIGNOR TO THE B. F. GOODRICH COMPANY, OF NEW YORK, N. Y., A CORPORATION OF NEW YORK.

INTERNAL-PRESSURE TIRE-VULCANIZING APPARATUS.

1,164,639.

Specification of Letters Patent.

Patented Dec. 21, 1915.

Application filed January 28, 1915. Serial No. 4,932.

*To all whom it may concern:*

Be it known that I, JOHN R. GAMMETER, a citizen of the United States, residing at Akron, in the county of Summit and State of Ohio, have invented certain new and useful Improvements in Internal-Pressure Tire-Vulcanizing Apparatus, of which the following is a specification.

This invention relates to a vulcanizing apparatus for pneumatic tire casings, having provision for establishing a difference of fluid pressure between the interior and the exterior of the tire for the purpose of expanding the latter and holding it expanded during vulcanization, thereby removing wrinkles from the fabric and equalizing the tension upon the threads, so that all parts of the carcass in the finished tire will be adapted to withstand their proportionate part of the working strains. The general principles of this method are well known and it has been quite extensively practised with certain types of tires, particularly "Silvertown" cord tires where the practice is to remove the raw tire from the making-core, introduce an annular water bag or tube, and cure the tire under pressure in a metal mold; and also with two-cure canvas tires where the carcass is semi-cured on the making-core, removed therefrom, an air tube introduced, a semi-cured tread applied, the tire wrapped, and then finally cured on the distended air-bag. The internal pressure method is also well known in connection with single tube tires. In using this method in the vulcanization of open-sided casings on the making-core, I have encountered certain difficulties connected with the distribution and flow of the rubber in the tread and side strips, which it is the object of the present invention to overcome. With a mold of the ordinary shape and a smooth core of the ordinary shape reduced in size enough to give the tire room to expand, the tendency is for the tread portion to expand first and crowd some of the soft unvulcanized tread rubber down onto the flanks of the tire, and thus plug or seal the flank portions of the mold space and prevent the internal pressure from becoming effective on these portions, with the result that ridges of rubber and sometimes ridges of fabric will be formed along the tire flanks or sides above the beads. I have discovered that this difficulty may be avoided by forming the flanks of the core with circumferential distributing channels which allow the fluid pressure to expand the sides of the tire before the tread is fully expanded. The mold space at the flanks is suitably shaped to permit the necessary side expansion, and I prefer to so shape it that these flank spaces will be of uniform width for a considerable distance in a radial direction and will then contract or taper rather abruptly above the beads.

Of the accompanying drawings, Figure 1 represents a transverse sectional view, partly broken away, showing a tire molding apparatus constructed according to my invention, and an unexpanded tire in place therein. Fig. 2 represents a side elevation on a larger scale of a segment of the core. Fig. 3 represents a section on the line 3—3 of Fig. 1.

In the drawings, 10, 10 are the two halves of an outer mold and 11 is the annular core or mandrel, which is made hollow for the sake of lightness, and is preferably a continuous or integral ring without joints in order to avoid leakage of the pressure fluid from the inside of the tire, such cores being commonly known as "solid", to distinguish them from the "segmental" cores used in making tires which have inextensible beads. This core is also a solid-walled, as distinguished from a perforate-walled core whose hollow interior is used as a fluid-receiving and distributing space, as I find it a great advantage to avoid the necessity for removing the air which tends to become entrapped in a perforated core and which, if allowed to remain, causes a difference in the curing of the upper and lower sides of the tire as it lies in the vulcanizer. The bead-receiving parts of the mold space could have the shape of an ordinary clencher tire, and my invention may also be adapted to sectional cores for making inextensible bead tires, but as it is desirable from a manufacturing standpoint to use a continuous or solid core for tires to go on all types of rims, I prefer in most instances to form the core 11 with two grooves 12 to accommodate so-called "reversed" beads or toes, and two ridges 13 making inwardly-open grooves or channels in the tire to receive inextensible rings which are placed in the vulcanized tire after its removal from the core. The outer mold members 10 may or may not be formed with groove 14, according to whether the tire is of the "quick-detachable clencher" type here shown, or of the "straight-side" type. The bead filler or fillers in each margin are made of rubber compound or other material which is sufficiently flexible for the tire to be stripped from the core.

Coming to the features which represent my invention, it will be noted that the flanks of the core, or those parts, above the beads, lying on the inner side of a transverse diameter A—A, as distinguished from the crown or dome of the core lying on the outer side of said diameter, are formed with a series of parallel circumferential grooves 15 connected at suitable intervals by cross grooves 16. The crown of the core is or may be smooth as shown.

Any suitable means or procedure may be adopted for creating a preponderance of fluid pressure on the inner side of the tire casing during vulcanization, and for supplying a heating medium to cure the rubber. The outer mold here shown is the ordinary unjacketed type adapted to be clamped or stacked with others between press-plates in a vulcanizer pot, to which is admitted live steam which surrounds and heats the molds, and I prefer to employ hydraulic internal pressure admitted through a supply duct which may discharge at any suitable point on the periphery of the core. The supply duct 17 may conveniently be a radial drilled passage transversing a partition 18 cast in the body of the core. At the inner periphery of the core 11 the duct 17 connects with a branch supply pipe leading from any suitable outside source of supply. I have shown a form of quick-acting coupler which I believe to be novel but which is not claimed in the present application, the same comprising a coupling member 19 having a tapered end and an alining nipple 20 adapted to enter a socket in the core provided with a packing gasket 21, on one side of the inner circle of the core, and a rod 22 with a pointed end 23 adapted to be stepped in a conical recess on the opposite side of the core circle, said rod having a grip or handle 24 and a screw connection at 25 with the member 19, whereby the combined length of the members 19, 22 may be decreased to release the coupling or increased after the manner of a screw-jack to establish a fluid-tight connection at the left-hand end. The member 19 is drilled with a water passage 26 connecting with a pipe 27, which is preferably flattened at 28 and occupies a shallow radial groove 29 on the top of the upper mold member 10. On the outer end of the pipe 27 a suitable flexible connection (not shown) may be made with a trunk pipe leading from the outside of the vulcanizer pot for supplying the said pipe 27 and the branch pipes leading to other molds in the vulcanizer.

In molding a tire casing 30 with this apparatus, the thickness of the canvas and rubber layers is determined in advance so as to leave room all around the body of the tire for the expansion of the latter in the mold space 31, and it will be noted that this mold space at the flanks of the tire is of substantially uniform width for a considerable distance in a radial direction and then tapers or contracts rather abruptly to the places immediately above the beads where the outer mold is in permanent contact with the margins of the tires, these margins being firmly clamped and forming water-tight seals between the core and the outer mold parts. The inner flank surfaces of the carcass are supported on the ridges between the grooves 15, and said grooves and the cross grooves 16 form distributing channels for the pressure fluid which is admitted from the supply duct 17 after the mold has been clamped in the vulcanizer press. The tire is made with an inner ply or coating impervious to water, and when the water is admitted it readily finds its way between the tire and the crown of the core 11 and enters the grooves 15, 16 before the pressure has had time to fully expand the tread of the tire against the outer mold. All parts of the tire body are therefore expanded evenly and simultaneously or nearly so, and there is no tendency of the tread rubber to crowd down around the sides and plug up the flank spaces or form ridges of rubber or fabric on the flanks.

It will be understood that the side distributing channels may be variously formed and arranged, and the described details of construction otherwise modified without departing from the scope of my invention.

I claim:

1. A tire-vulcanizing core having external circumferential fluid-distributing channels on its flanks.

2. A solid-walled tire-vulcanizing core having circumferential fluid-distributing channels on its flanks, and a fluid-supply duct discharging on the crown of the core.

3. A tire-vulcanizing core having a series of parallel circumferential grooves on its flank.

4. A tire-vulcanizing core having on its flank a series of circumferential fluid-distributing grooves, and one or more cross grooves connecting said circumferential grooves.

5. A tire-vulcanizing core having on each flank a series of circumferential grooves, cross grooves connecting the grooves of each set, and a fluid-supply duct leading to the periphery of said core.

6. In tire-vulcanizing apparatus, an outer mold and an inner core spaced apart a substantially uniform distance radially along the flank portions thereof, means for introducing an expanding fluid into the interior of the tire, and means for distributing the fluid uniformly to the flank surfaces of the core.

7. In tire-vulcanizing apparatus, an outer mold and an inner core separated by a tire-receiving space which is of substantially uniform width along a considerable part of the flank portions and contracts abruptly above the bead portions, said core having a pressure-fluid duct leading to its periphery, and means for distributing the fluid along the flank surfaces of the core.

8. In tire-vulcanizing apparatus, an outer mold and an inner core separated by a tire-receiving space which is of substantially uniform width along a considerable part of the flank portions and contracts abruptly above the bead portions, said core having on its flanks circumferential fluid-distributing grooves connected by cross grooves, and a fluid supply duct in said core leading to the crown surface thereof.

In testimony whereof I have hereunto set my hand in the presence of two subscribing witnesses, this 26th day of January, 1915.

JOHN R. GAMMETER.

Witnesses:
 WALTER K. MEANS,
 C. HIRLEMANN.